US011159995B2

(12) United States Patent
Huang et al.

(10) Patent No.: US 11,159,995 B2
(45) Date of Patent: Oct. 26, 2021

(54) DEVICE AND METHOD FOR PERFORMING HANDOVER IN MASSIVE MULTIPLE-INPUT-MULTIPLE-OUTPUT (MIMO) SYSTEMS

(71) Applicant: Intel Corporation, Santa Clara, CA (US)

(72) Inventors: Min Huang, Beijing (CN); Yuan Zhu, Beijing (CN); Xu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/083,894

(22) PCT Filed: Apr. 14, 2016

(86) PCT No.: PCT/CN2016/079295
§ 371 (c)(1),
(2) Date: Sep. 11, 2018

(87) PCT Pub. No.: WO2017/177421
PCT Pub. Date: Oct. 19, 2017

(65) Prior Publication Data
US 2019/0075496 A1  Mar. 7, 2019

(51) Int. Cl.
*H04W 36/30* (2009.01)
*H04W 36/00* (2009.01)
(Continued)

(52) U.S. Cl.
CPC ........ *H04W 36/0085* (2018.08); *H04B 7/024* (2013.01); *H04B 7/0413* (2013.01);
(Continued)

(58) Field of Classification Search
CPC ....... H04W 36/0061; H04W 36/00835; H04W 88/08; H04B 7/0413; H04B 7/0617; H04B 7/024; H04B 7/0473
See application file for complete search history.

(56) References Cited

U.S. PATENT DOCUMENTS 9,007,263 B2 * 4/2015 Su .................. H04B 7/0417
342/373
9,730,134 B2 * 8/2017 Yilmaz ................. H04W 8/005
(Continued)

FOREIGN PATENT DOCUMENTS

CN          1852558 A    10/2006
CN        102572887 A     7/2012
(Continued)

OTHER PUBLICATIONS

16x16 Multiuser MIMO Testbed Employing Simple Adaptive Modulation Scheme Kentaro Nishimori, Riichi Kudo, Naoki Honma, Yasushi Takatori and Masato Mizoguchi NTT Network Innovation Laboratories, NTT Corporation 1-1 Hikari-no-oka, (Year: 2009).*
(Continued)

*Primary Examiner* — Edan Orgad
*Assistant Examiner* — Malick A Sohrab
(74) *Attorney, Agent, or Firm* — Viering, Jentschura & Partner mbB

(57) ABSTRACT

In various aspects, devices and methods for performing a handover in a MIMO system are described herein. According to at least one aspect, a wireless communication device is described to include one or more receivers that measures beams of a neighbor cell in response to a command of a MIMO communication system. In some aspects, the wireless communication device further includes one or more transmitters that reports information of the beams based on the measured beams to the massive MIMO communication
(Continued)

system. The information is, in at least one aspect, incorporated in a Beam Specific-Neighbor Cell Relation (BS-NCR).

20 Claims, 10 Drawing Sheets

(51) Int. Cl.
    *H04B 7/0456*   (2017.01)
    *H04B 7/024*    (2017.01)
    *H04B 7/0413*   (2017.01)
    *H04B 7/06*     (2006.01)
    *H04W 88/08*    (2009.01)

(52) U.S. Cl.
    CPC ......... *H04B 7/0473* (2013.01); *H04B 7/0617* (2013.01); *H04W 36/0061* (2013.01); *H04W 36/00835* (2018.08); *H04W 88/08* (2013.01)

(56) References Cited

U.S. PATENT DOCUMENTS

| | | | | |
|---|---|---|---|---|
| 2012/0178451 A1* | 7/2012 | Kubota | .................. | H04W 8/00 455/436 |
| 2013/0094544 A1* | 4/2013 | Moshfeghi | ........... | H04B 7/0689 375/219 |
| 2013/0155847 A1 | 6/2013 | Li et al. | | |
| 2013/0182594 A1* | 7/2013 | Kim | .................... | H04W 72/085 370/252 |
| 2014/0073337 A1* | 3/2014 | Hong | .................... | H04W 16/28 455/452.1 |
| 2015/0264579 A1* | 9/2015 | Claussen | ............... | H04W 16/28 455/452.1 |
| 2015/0312776 A1* | 10/2015 | Cui | ....................... | H04W 36/04 370/235 |
| 2015/0365211 A1* | 12/2015 | Oh | ......................... | H04L 5/005 370/329 |
| 2016/0007261 A1* | 1/2016 | Oh | ......................... | H04B 7/088 455/438 |
| 2016/0150435 A1* | 5/2016 | Baek | ..................... | H04W 24/10 370/252 |
| 2016/0309376 A1* | 10/2016 | Liu | ................... | H04W 36/0055 |
| 2016/0337916 A1* | 11/2016 | Deenoo | ............. | H04W 36/0088 |
| 2017/0295508 A1* | 10/2017 | Stirling-Gallacher | ....................... | H04L 5/0048 |
| 2018/0152869 A1* | 5/2018 | Cedergren | ........... | H04B 7/0408 |
| 2018/0220406 A1* | 8/2018 | Mizusawa | ................ | H04B 7/04 |
| 2018/0279189 A1* | 9/2018 | Bergstrom | ............. | H04B 7/024 |

FOREIGN PATENT DOCUMENTS

| | | |
|---|---|---|
| CN | 103096372 A | 5/2013 |
| CN | 103491553 A | 1/2014 |
| CN | 104115419 A | 10/2014 |
| JP | 2009074839 A | 4/2009 |
| WO | 2015100533 A1 | 7/2015 |

OTHER PUBLICATIONS

International Search Report based on application No. PCT/CN2016/079295 (11 pages) dated Dec. 30, 2016 (Reference Purpose Only).
Samsung et al., "New SID Proposal: Study on Elevation Beamforming/Full-Dimension (FD) MIMO for LTE", 3GPP TSG RAN Meeting #65, RP-141644, Sep. 12, 2014.
First Search issued for CN application No. 2016800835446, dated Sep. 21, 2020, 2 pages (for informational purpose only).
First Office Action issued for CN application No. 2016800835446, dated Sep. 30, 2020, 15 total pages (6 pages + 9 pages of translation) (for informational purpose only).

* cited by examiner

DEVICE AND METHOD FOR PERFORMING HANDOVER IN MASSIVE MULTIPLE-INPUT-MULTIPLE-OUTPUT (MIMO) SYSTEMS

CROSS-REFERENCE TO RELATED APPLICATIONS

This patent application is a national stage entry of International Application No. PCT/CN2016/079295 under 35 U.S.C. §§ 365 and 371, filed on Apr. 14, 2016, and is incorporated herein by reference in its entirety and for all purposes.

FIELD

The present disclosure generally relates to wireless communication devices and methods for performing handover in massive MIMO communication systems.

BACKGROUND

Multiple-Input-Multiple-Output (MIMO) is widely used for modern wireless communication systems, for example, for Long Term Evolution (LTE) wireless communication systems, and systems beyond LTE, for example, $5^{th}$ Generation (5G) wireless communication systems. In a MIMO communication system, multiple antennas are used at both transmitters and receivers. Also, a MIMO communication system makes it possible to send and receive more than one data signal on a same radio channel at a same time. For advanced wireless communication, massive MIMO technology is under development. In a massive MIMO communication system, a large number of antennas, transmitters, and receivers are employed for a wide range of frequency carriers. Such a system greatly increases system capacity, extends coverage of cells, and reduces level of interference. An enhanced handover procedure may be desired for high performance of downlink and uplink data transfer for User Equipment (UEs) at cell edges, and for avoidance of handover delays or handover failures within a massive MIMO communication system.

BRIEF DESCRIPTION OF THE DRAWINGS

In the drawings, like reference characters generally refer to the same parts throughout the different view. The drawings are not necessarily to scale, emphasis instead generally being place upon illustrating the principles of the present disclosure. In the following description, various aspects are described with reference to the following drawings, in which.

DETAILED DESCRIPTION

The following detailed description refers to the accompanying drawings that show, by way of illustration, specific details and aspects of the present disclosure. Other aspects may be utilized and structural, logical, and electrical changes may be made without departing from the scope of the present disclosure. The various aspects of the present disclosure are not necessarily mutually exclusive, as some aspects of the present disclosure can be combined with one or more other aspects of the present disclosure to form new aspects.

Figure 1:
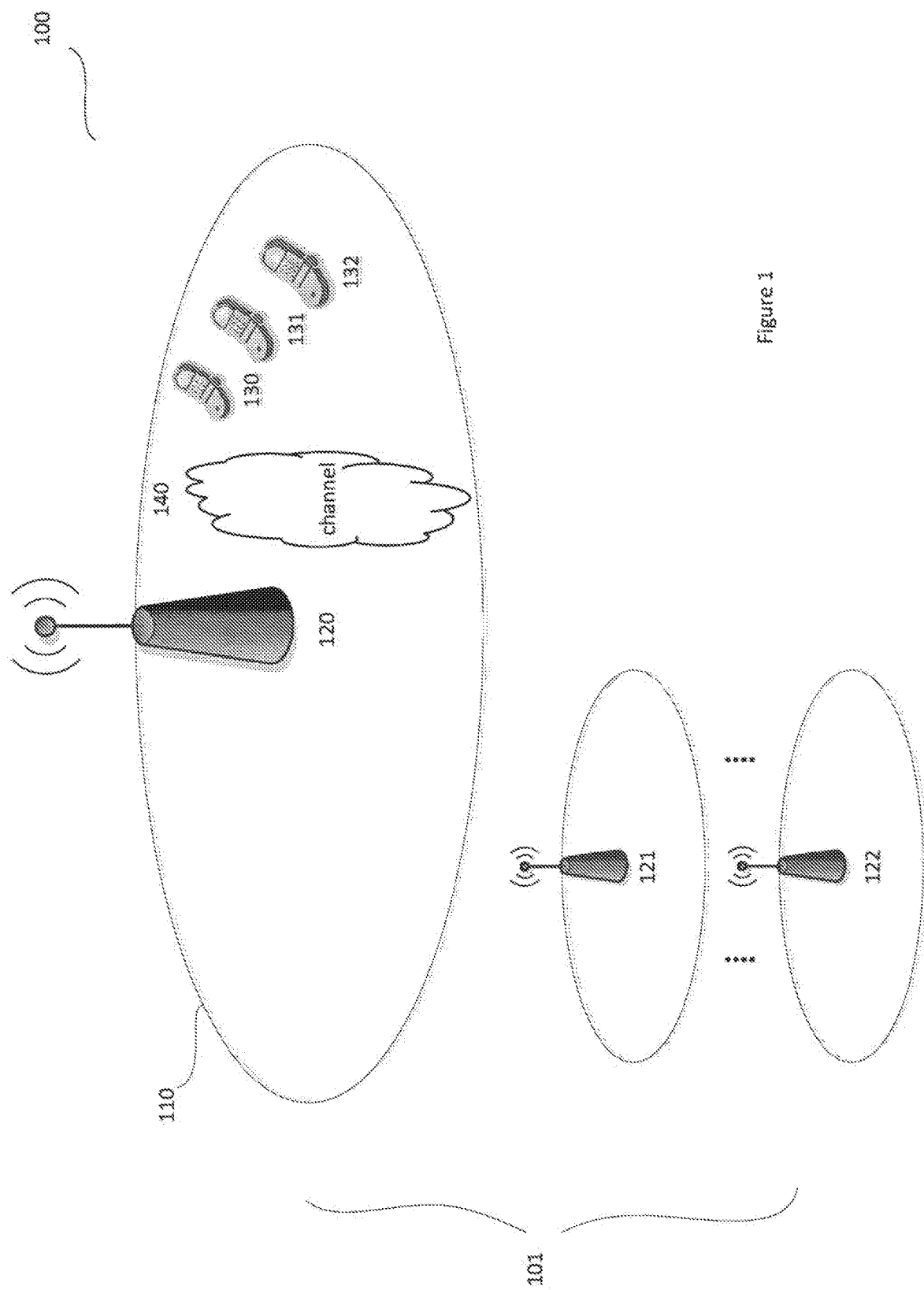
FIG. 1 shows a wireless communication system, for example, a LTE wireless communication system, or a 5G wireless communication system in accordance with some embodiments.

FIG. 1 shows a wireless communication system 100, for example, a LTE wireless communication system, and systems beyond LTE, for example, a 5G wireless communication system in accordance with some embodiments.

The wireless communication system 100, for example, a LTE or a 5G wireless communication system, includes a radio access network 101. The radio access network 101 may include base stations 120-122 (e.g. eNodeBs, eNBs, according to LTE). Each base station, for example, the base station 120 may provide radio coverage for one or more mobile radio cells, for example, mobile radio cell 110, of the radio access network 101.

A plurality of wireless communication devices 130-132 (also referred to as mobile terminals, User Equipment (UEs), Mobile Stations (MS), mobile devices, receivers, transmitters, or transceivers) may be located in the mobile radio cell 110 of the wireless communication system 100. A wireless communication device, for example, wireless communication device 130 may communicate with other wireless communication devices, for example, wireless communication device 131 or 132, via a base station, for example, base station 120, providing coverage for (in other words, operating) the mobile radio cell, for example, mobile radio cell 110.

For radio communication via an air interface channel, for example, channel 140, a wireless communication device, for example, wireless communication device 130, may include a chain of Radio Frequency (RF), and a plurality of antennas, and a baseband processor. A chain of RF which may also be referred to as an RF chain may include an RF receiver, an RF transmitter, or an RF transceiver. A plurality of antennas may form multiple antenna arrays. A baseband processor may include, for example, an analog baseband to provide analog signal processing, an Analog-to-Digital Converter (ADC) and Digital-to-Analog Converter (DAC) to provide conversions between the analog and digital domains, and a digital baseband to provide digital signal processing. A chain of RF may be also a physical RF block that may process multiple parallel signals.

The wireless communication device, for example, wireless communication device 130, may be within coverage of one or more mobile communication networks that may operate according to a same RAT (Radio Access Technology) or according to different RATs.

The radio access network 101 may support communication according to various communication technologies, e.g. mobile communication standards. Each base station, for example, 120, may provide a radio communication connection via an air interface channel, for example, channel 140, between the base station 120 and a wireless communication device, for example, wireless communication device 130, according to 5G, LTE, Universal Mobile Telecommunications System (UMTS), Global System for Mobile Communications (GSM), Enhanced Data Rates for GSM Evolution (EDGE) radio access.

The term handover is commonly used within a variety of international organizations such as $3^{rd}$ Generation Partnership Project (3GPP). In wireless communication systems, a handover generally means a wireless communication device in progress is redirected from its current cell, referred to as source cell, to a neighbor cell, referred to as target cell. A handover is usually conducted when the source cell and the target cell are different cells, referred to as inter-cell handover. An inter-cell handover is to maintain communication such as an ongoing call or an ongoing data transmission when subscriber is moving out of the area covered by the source cell and entering the area of the target cell. A handover may be also conducted, for example, when the source cell and the target cell are one and the same cell, and only the used air interface channel changes, referred to as intra-cell handover. An intra-cell handover is to change one air interface channel which may be interfered or fading with a new clearer or less fading air interface channel.

Figure 2:
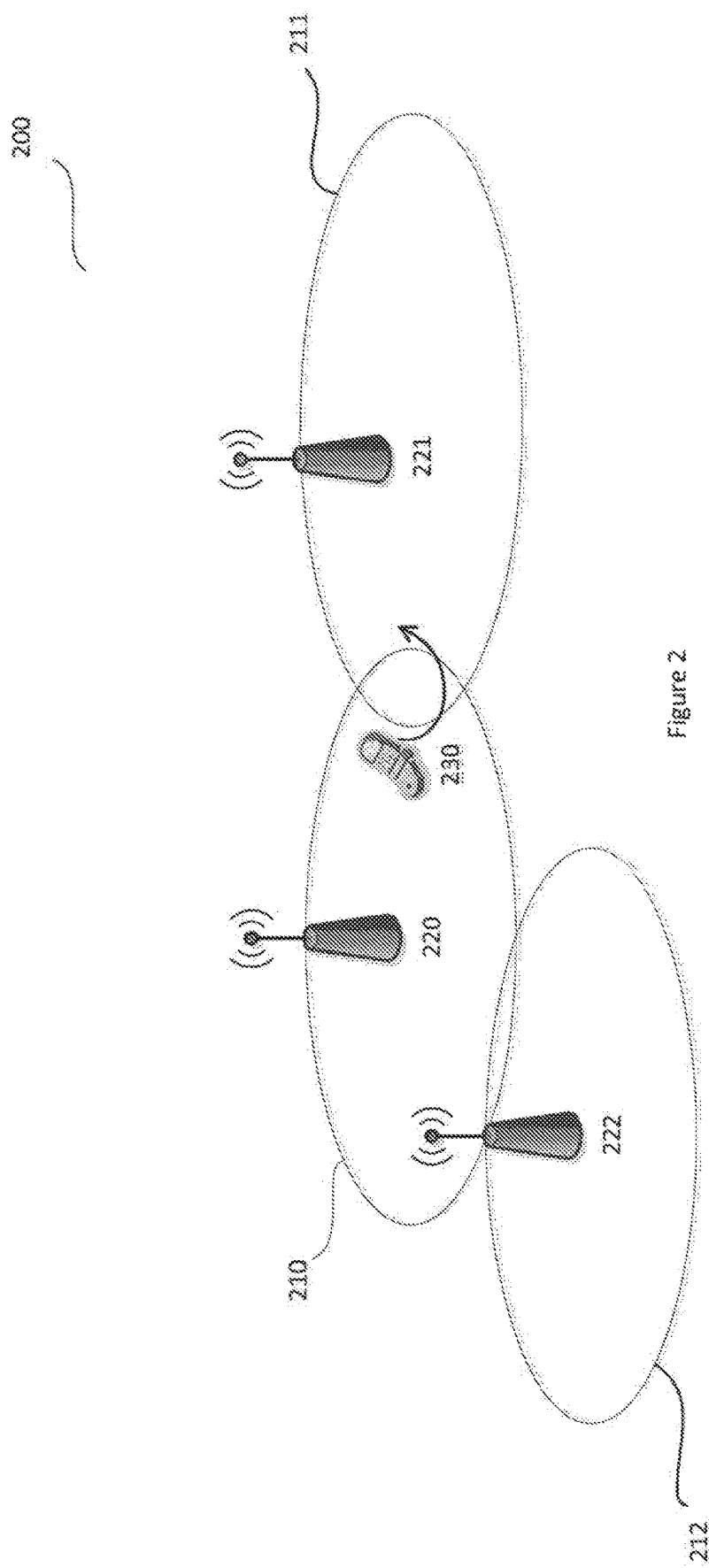
FIG. 2 shows an exemplary handover scenario in cells within a MIMO system.

FIG. 2 shows an exemplary handover scenario 200 within a wireless communication system, for example, a LTE wireless communication system, or a 5G wireless communication system. A LTE wireless communication system applies, for example, MIMO according to 3GPP. There are, for example, base station 220 providing radio coverage for cell 210, base station 221 providing radio coverage for cell 211, base station 222 providing radio coverage for cell 212, and a wireless communication device 230 within such a system. As shown, the wireless communication device 230 is moving away from the cell 210 to the cell 211, in other words, from the current cell 210 to the neighbor cell 211, from the source cell 210 to the target cell 211, or the wireless communication device 230 is at cell edge. A neighbor cell or a target cell, for example, the neighbor cell 211, is a cell locates close to a source cell, for example, the source cell 210, for a handover. For each of the cells, for example, cells 210, 211, and 212, corresponding base stations 220, 221, and 222 is triggered to set up and maintain a table of Neighbor Cell Relation (NCR) when a wireless communication device conducts a handover from a cell to another, or takes measurements for a handover. A NCR may contain a handover relation from a source cell to a target cell, and may further contain cell-specific handover parameters including Cell Individual Offset (CIO) and Time To Trigger (TTT). The source base station, for example, source base station 220, for the source cell, for example, source cell 210, may indicate such NCR to a wireless communication device, for example, wireless communication device 230, at cell edge, and may inform prioritized target cell candidates for neighbor cell measurement so as to reduce time for measurements and to improve accuracy.

An example of table of NCR is shown in table 1. It may be also referred to as cell-specific NCR, a legacy from LTE.

TABLE 1 an example of legacy cell-specific Neighbor Cell Relation (NCR)

| current cell/ source cell | neighbor cell/target cell | handover parameter |
|---|---|---|
| cell 210 | cell 211 | cell individual offset accodring to 3GPP TS36.331 = 0 dB, time to trigger according to 3GPP TS36.331 = 10 ms, etc. |
| cell 210 | cell 212 | cell individual offset accodring to 3GPP TS36.331 = 3 dB, time to trigger according to 3GPP TS36.331 = 20 ms, etc. |
| ... | ... | ... |
| cell 210 | cell N | cell individual offset accodring to 3GPP TS36.331 = −3 dB, time to trigger accodring to 3GPP TS36.331 = 10 ms, etc. |

In an advanced wireless communication system such as a 5G wireless communication system, the number of cells may increase dramatically, for example, by 10 times or by more than 10 times. In an advanced wireless communication system, various small cells and carrier frequencies may be used, and the number of cells in a heterogeneous network may naturally increase. With the increased number of cells, system's capacity increases, wireless coverage improves, and infrastructure's cost goes down. This may also mean, the number of target cells for each source cell increases dramatically, base stations of each source cell may need longer time for neighbor cell measurements before finding an optimal cell as a target cell.

Moreover, some of the cells or most of the cells of an advanced wireless communication system such as a 5G wireless communication system may employ a plurality of antennas, transceivers, or transmitters and receivers. Cells which employ a plurality of antennas, transceivers, or transmitters and receivers are referred to as cells with massive MIMO. A wireless communication system includes a plurality of cells with massive MIMO is referred to as massive MIMO system. A massive MIMO system may cover a wide range of frequency carriers, for example, from low-frequency carriers such as lower than 6 GHz frequency carriers to high-frequency carriers such as 6 GHz-100 GHz frequency carriers. A massive MIMO system may also cover frequency carriers higher than 100 GHz. A massive MIMO system greatly increases system capacity, extends cell coverage, and reduces interference level.

However, within a massive MIMO system, for example, with increased number of cells and increased number of cells employing massive MIMO, a base station of a target cell needs to pay a certain amount of time to obtain information of a suitable beam for a handover procedure. In order to obtain information of a suitable beam, according to the current handover procedure for LTE defined by 3GPP, a base station of a target cell needs to wait for a wireless communication device to send a measurement report after a handover, or to wait for a wireless communication device to send a Sounding Reference Signal (SRS) at a target cell and then to calculate a suitable beam. A suitable beam may, for example, fit for downlink channels, or be applied for uplink channels if there is a channel reciprocity that is greater than, for example, a pre-determined threshold. It may also result in better performances for downlink or uplink data signals transferred for a wireless communication device that is to perform a handover. The better performances may include, for example, larger Signal-to-Interference-plus-Noise Ratio (SINR). The better performances may include also other improved metrics. It may also reduce interference to other concurrent signals. The two steps for obtaining information of a suitable beam may cause serious handover delays or even handover failures if number of cells and number of cells with massive MIMO increase.

As described, according to the current handover procedure for LTE defined by 3GPP, a base station of a target cell has no prior knowledge about channel spatial information of any incoming wireless communication devices until a wireless communication device reports beam measurement results or sends SRS to the base station of the target cell. For enhancing performance of downlink and uplink data transfer in a wireless communication system with increased number of cells and massive MIMO cells, coherence of transmission and reception may be desired. This may mean, channel spatial information of wireless communication devices at cell edge is known by a target cell in advance. Therefore, an enhanced handover procedure may be desired for a high performance of downlink and uplink data transfer, for avoidance of handover delays or handover failures.

Figure 3:
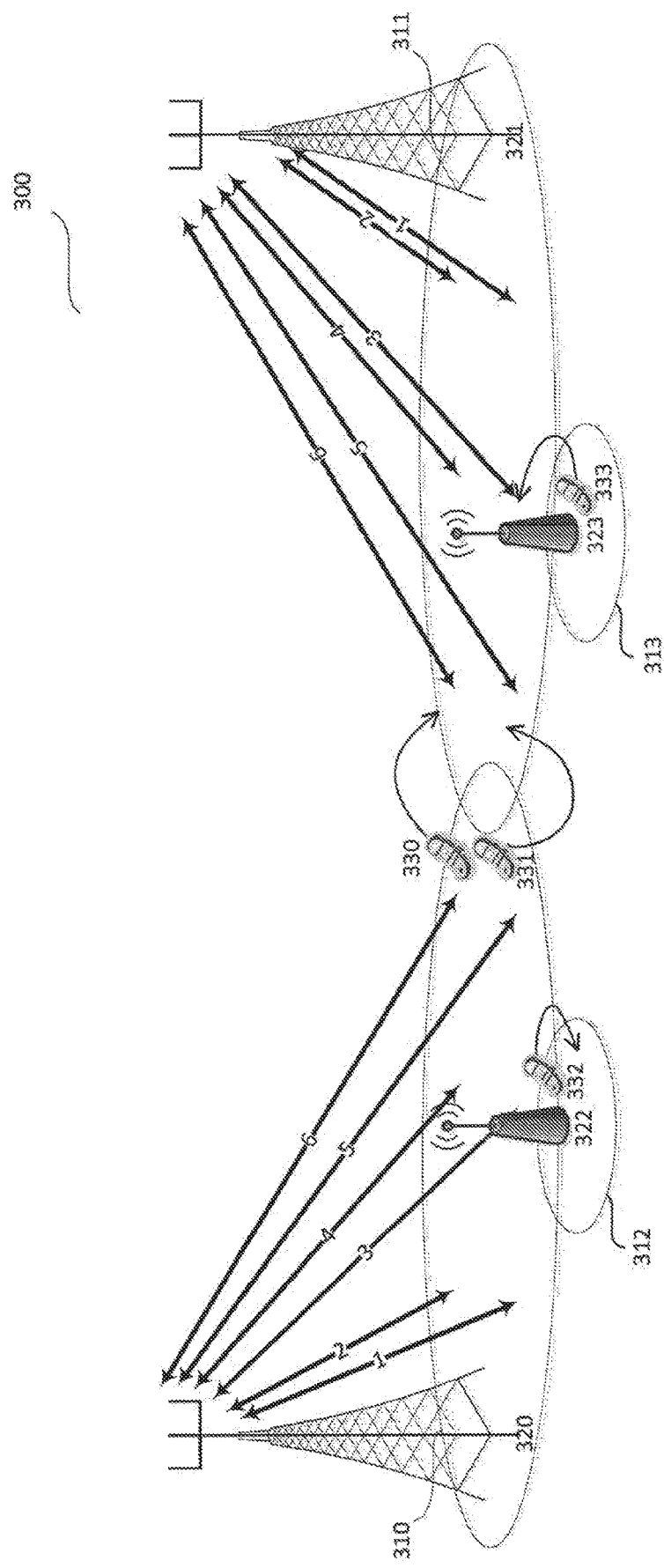
FIG. 3 shows an exemplary handover scenario in cells within a massive MIMO system in accordance with some embodiments.

FIG. 3 shows an exemplary handover scenario 300 in cells within a massive MIMO system, for example, a LTE wireless communication system, or a 5G wireless communication system in accordance with some embodiments. There are, for example, base station 320 providing radio coverage for cell 310, base station 321 providing radio coverage for cell 311, base station 322 providing radio coverage for cell 312, base station 323 providing radio coverage for cell 313, and wireless communication devices 330, 331, 332 and 333 within the wireless communication system. Amongst the example cells within the wireless communication system, cells 310 and 311 apply massive MIMO whereas cells 312 and 313 don't apply massive MIMO. As shown, the wireless communication devices 330 and 331 are moving away from the cell 310 to the cell 311, the wireless communication device 332 is moving away from the cell 310 to the cell 312, and the wireless communication device 333 is moving away from the cell 313 to the cell 311. In other words, the wireless communication devices 330, 331, 332 and 333 are moving away from a current cell to a neighbor cell, from a source cell to a target cell, or the wireless communication devices 330, 331, 332 and 333 are at cell edge.

In a massive MIMO cell, for example, cell 310, or cell 311, radiated energy from the antennas of the base station 320 for the cell 310 and radiated energy from the antennas of the base station 321 for the cell 311 may be concentrated into a set of beams. In some embodiments, both of the radiated energies may be concentrated into a set of beams of $\{1, 2, 3, 4, 5, 6\}$. Both of the radiated energies may be also concentrated into other sets of beams, or each of the radiated energies may be also concentrated into different sets of beams. As shown, coverage of cell 310 or cell 311 may be divided into small pieces of coverage by the beams 1, 2, 3, 4, 5 and 6. In a MIMO cell where massive MIMO doesn't apply, for example, cell 312, or cell 313, radiated energy from the antenna of the base station 322 for the cell 312 and radiated energy from the antenna of the base station 323 for the cell 313 may be concentrated into one single beam, respectively. In some embodiments, coverage of cell 312 may be beam 3, and coverage of cell 313 may be beam 4. Other individual beams may also apply.

As shown, in a massive MIMO system, selection of a dedicated beam for each of the wireless communication devices, for example, for a wireless communication device at cell edge, becomes more critical than a MIMO system where massive MIMO doesn't apply. The current handover procedure according to LTE defined by 3GPP doesn't take action prior to a handover. Instead, actions are only taken after the handover. The after-handover actions may include, for example, a base station of a target cell assigning a dedicated reference signal to each of available beams, broadcasting over its cell, and a wireless communication device measuring the reference signals, reporting back about the one that fits the most. The after-handover actions may also include, for example, a wireless communication device being configured to send a SRS by a base station of a target cell (referred to as a target base station), and the target base station scanning different beams received from the wireless communication device and selecting the one, for example, with the large gain. The current handover procedure is not efficient enough for a massive MIMO system. A more efficient beam selection for an enhanced handover performance within a massive MIMO wireless communication system may be desired.

In the following, an enhanced handover procedure for better utilizing a massive MIMO wireless communication system is described. In some embodiments, an enhanced procedure may include setting up a Beam Specific-Neighbor Cell Relation (BS-NCR) and utilizing the BS-NCR. For setting up a BS-NCR, a source base station 320 for a source cell, for example, source cell 310 illustrated by FIG. 3, signals a wireless communication device at cell edge, for example, wireless communication device 330 illustrated by FIG. 3, to measure beamformed reference signals at a neighbor cell, for example, cell 311 illustrated by FIG. 3. Moreover, the source base station 320 may signal the wireless communication device 330 about spatial waveform formed by the beamformed reference signals of the neighbor cell 311 based on certain antenna weights experiencing radio propagation channels. The source base station 320 may provide relevant locations and sequences of the beamformed reference signals to the wireless communication device 330 as well. The wireless communication device 330 measures and reports results of the measurements in response to the source base station 320. Such measurements may be conducted at a time prior to or the same as when the wireless communication device 330 measures neighbor cell 311's RSRP (Reference Signal Received Power) or RSRQ (Reference Signal Received Quality) for handover. Parameters such as RSRP and RSRQ, including absolute or relative signal strength of cell-specific reference signals in the neighbor cell 311, also referred to as the target cell 311, belong to the legacy handover procedure for LTE systems of 3GPP without considerations of dedicated beams for massive MIMO cells or massive MIMO systems.

Measurements conducted at a time prior to when wireless communication device 330 measures neighbor cell 311's related parameters for handover may be, for example, triggered by a small A3-event threshold, for example, a 0 dB threshold. A small A3-event threshold may be configured to trigger the measurements of neighbor cell 311's beamformed reference signals. An A3-event is when a neighbor cell becomes offset better than a serving cell, also referred to as a current cell or a source cell, according to 3GPP TS36.331. As described, the measurements are sufficiently earlier than a handover trigger, and therefore, cause no impact to handover execution time in the source cell 310. Moreover, wireless communication devices, for example, wireless communication device 330 may also be able to conduct such measurements without a need to perform handovers. In some embodiments, results of measurements may be kept for future handovers or statistical analyzing.

Measurements conducted at the same time when wireless communication device 330 measures neighbor cell 311's related parameters for handover may be, for example, results of the measurements of the neighbor cell 311's beamformed reference signals. Both of the results of the measurements are recorded in a same measurement report. The report may be signaled to the wireless communication system as required for a legacy handover. In this way, only the wireless communication device, for example, wireless communication device 330 which is to perform a handover conducts such measurements.

The base station 320 for the source cell 310, also referred to as source base station 320, may incorporate information of used beam(s) for the current cell, also referred to as the source cell 310, and information of reported beam(s) for the neighbor cell 311 in a NCR in response to receipt of the report. The NCR indicates cell relation as well as beam-specific relation between the current cell 310 and the neighbor cell 311. Therefore, a BS-NCR is generated base on the NCR. A BS-NCR may be maintained in a statistical way, or be updated in an immediate way. It may be regarded as an enhanced Automatic Neighbor Relation (eANR) function, and hence, may belong to a kind of Self-Optimization Network (SON) technology. In some embodiments, if any other later handover or measurement results indicate that the current beam in the source cell corresponds to another target cell and/or another target beam, the related information incorporated in a BS-NCR may be updated accordingly in response to the later handover, or to receipt of the measurement results.

For utilizing a BS-NCR, the base station 320 for the source cell 310 may acquire information of currently used beam of the wireless communication device 330 which goes through a handover. The base station 320 for the source cell 310, also referred to as source base station 320, may then search information of neighbor beams of the neighbor cell 311 indicated in the BS-NCR. This is to address target beams which may be used within the neighbor cell 311.

Afterwards, the base station 320 for the source cell 310 may indicate information of neighbor beam(s) to the base station 321 for the neighbor cell 311, also referred to as the target cell 311, via an inter-base-station message such as a message in X2 interface. An X2 interface is, for example, a standardized inter-base-station interface in LTE. Other inter-base-station messages may be also applicable. The base station 321 for the target cell 311 may utilize the indicated information of neighbor beam(s), and perform data transfer for the wireless communication device 330 under a handover procedure, for example, for the wireless communication device 330 moving away from the source cell 310 to the target cell 311. In doing so, the base station 321 for the target cell 311 may not need to wait for obtaining information of suitable beam(s) after the wireless communication device 330 actually comes to the target cell 311. Therefore, handover latency may be decreased and handover failure ratio may be reduced.

Further, the source base station 320 may indicate information of neighbor beam(s) to the target base station 321 via an inter-base-station message such as a message in X2 interface. The source base station 320 may also indicate the wireless communication device 330 to start to hand over, or to move to the target cell 311. The wireless communication device 330 may then perform a handover, or a movement. The target base station 321 may utilize the indicated information of neighbor beam(s), and perform data transfer for the wireless communication device 330 under the handover, for example, for the wireless communication device 330 moving away from the source cell 310 to the target cell 311.

Moreover, an enhanced handover procedure may also include base stations incorporating information of beams in BS-NCRs. The information of beams may include beams currently used in a source cell as well as in all neighbor cells. The incorporating of information of beams in BS-NCR may be conducted upon a trigger of an imminent handover, for example, through a request for a handover, or a wireless communication device physically moving away from a cell to another cell. The incorporating of information of beams in BS-NCRs may be also conducted even if there is no handovers in any time soon. The information of beams written into BS-NCRs may be kept for one time use for a handover, or, may be kept for handovers only within pre-defined time periods. Or, the information of beams written into BS-NCRs may be merely kept for recording purposes. In some embodiments, the information may be kept for data analyzing in order to track performances of certain networks. In some embodiments, the information may be kept for statistic calculations in order to predict data trends for certain networks.

Wireless communication devices such as wireless communication devices 330, 331, 332 and 333 illustrated by FIG. 3 may include a plurality of antennas coupled to a plurality of transceivers, transmitters, receivers, and further coupled to a plurality of baseband processors for signal processing. The wireless communication devices may further include one or more dedicated or shared receivers for measurements, and one or more dedicated or shared transmitters for reports. Besides, the receivers and transmitters may perform handovers, for example, terminating receiving and transmitting signals within a source cell, and starting receiving and transmitting signals within a target cell. The wireless communication devices may also include a memory to store configured dedicated reference signal information of target cells, including reference signal sequences and locations. The wireless communication devices may further include other memories to store configured target cell identification. Moreover, the wireless communication devices may include one or more processors to calculate measured values, to determine whether a report event needs to be triggered, to determine which target cell and/or target beam to report, and to generate corresponding reporting messages. A report event may include, for example, an A3-event. An A3-event may be when a neighbor cell becomes offset better than a serving cell, also referred to as a current cell, or a source cell, according to 3GPP TS36.331. As described, a wireless communication device may be a UE, a mobile device, a receiver, a transmitter, a transceiver, or a MS.

As illustrated by FIG. 3, in some embodiments, wireless communication devices 330 and 331 go through a handover from a massive MIMO cell 310 to a massive MIMO cell 311. In some embodiments, each of the massive MIMO cells 310 and 311 may have a set of beams for dedicated beamforming, for example, beams {1, 2, 3, 4, 5, 6}. A base station, for example, base station 321, of the massive MIMO cell 311 may only know about which beams to use for wireless communication device 330 or wireless communication device 331 after these wireless communication devices connect to the massive MIMO cell 311 upon the handovers. It may take a certain period of time for the base station 321 of the massive MIMO cell 311 to configure measurements of the wireless communication devices 330 and 331, to receive report from the wireless communication devices 330 and 331, or to scan SRS (or other equivalent) signals of the wireless communication devices 330 and 331. This may cause handover delays or failures, or even interruptions of signal and/or data transmissions. In an enhanced handover procedure, beamformed reference signals of a target cell, for example, target cell 311, may be indicated to wireless communication devices that undergo a handover, for example, the wireless communication devices 330 and 331 in a source cell, for example, source cell 310. The wireless communication devices 330 and 331 may measure beams in the target cell 311 while approaching it. Based on results of measurements, for example, based on a desired receiving power, the wireless communication device 330 may report about beam 6 in the target cell 311 while using the beam 6 in the source cell 310, and the wireless communication device 331 may report about beam 5 in the target cell 311 while using the beam 5 in the source cell 310. Upon receipt of the reports, the base station 320 for the source cell 310, also referred to as source base station 320, may send the beam information to the base station 321 for the target cell 311, also referred to as target base station 321. The target base station 321 may then be able to accommodate the handovers of the wireless communication devices 330 and 331 with the given beam information, respectively.

With the beam information, the target base station 321 may be able to steer transmitting and receiving antennas to the indicated beam for downlink signal transmission and uplink signal transmission. The transmissions with indicated beams may continue as long as a new suitable beam is updated in another data transfer, or another signal transfer, or another data and signal transfer. In this way, link robustness may be improved when the wireless communication devices 330 and 331 connect to the target cell 311. Furthermore, when a beam is formed by a large number of physical transmitting and receiving antennas in a massive MIMO environment, the cell coverage size may be much wider than that of a cell with legacy beamforming by a small number of antennas. Therefore, without a correct beamforming, Signal to Interference-plus-Noise Ratio (SINR) for a wireless communication device at cell edge may become weak, and its data rate or even connection may be impaired.

At the same time, the beam information is written into a NCR by the source base station 320, and a BS-NCR is made, as shown in table 2. Information contained in the BS-NCR may be used for any upcoming handovers of wireless communication devices between the source cell 310 and the target cell 311. In some embodiments, if the wireless communication devices 330 and 331 continue using beam 6 and beam 5, respectively, in the target cell 311 upon a handover, the source base station 320 may not need to command the wireless communication devices 330 and 331 to measure beams of the target cell 311. Instead, the source base station 320 may search the existing BS-NCR to find out a suitable beam in the target cell 311 for each of the wireless communication devices, for example, beam 6 for the wireless communication device 330 and beam 5 for the wireless communication device 331.

TABLE 2 an example of a Beam Specific-Neighbor Cell Relation (BS-NCR)

| current cell | current beam | neighbor cell | neighbor beam | handover parameters |
|---|---|---|---|---|
| cell 310 | 5 | cell 311 | 5 | cell individual offset = 0 dB, time to trigger = 10 ms, etc. |
| cell 310 | 6 | cell 311 | 6 | cell individual offset = 3 dB, time to trigger = 20 ms, etc. |
| cell 313 | N/A | cell 311 | 3 | cell individual offset = 0 dB, time to trigger = 10 ms, etc. |
| cell 310 | 3 | cell 312 | N/A | cell individual offset = 0 dB, time to trigger = 10 ms, etc. |

Moreover, since the source cell 310 and the target cell 311 both apply massive MIMO, the source base station 320 may also directly indicate the beamforming utilized by the wireless communication devices 330 and 331 within the source cell 310 to the target base station 321. By this way, the source base station 320 and the target base station 321 may be both aware of the beamforming utilization within each other, and hence they may set up a bi-directional BS-NCR.

As illustrated by FIG. 3, in some embodiments, a wireless communication device 333 goes through a handover from a non-massive MIMO cell 313 to a massive MIMO cell 311. This means, the wireless communication device 333 goes to a cell with increased number of small cells. This scenario leads to higher occurrence probabilities. The massive MIMO cell 311 may have a set of beams for dedicated beamforming, for example, beams {1, 2, 3, 4, 5, 6} whereas the non-massive MIMO cell 313 may not have. A base station 321 of the massive MIMO cell 311 may know nothing about which beam to use for the wireless communication device 333 once it connects to the massive MIMO cell 311 upon the handover. Moreover, there may be no beam information used within the current cell, for example, the source cell 313 in the BS-NCR shown in Table 2. In an enhanced handover procedure, wireless communication device 333 within the source cell 313 and at the cell edge of the source cell 313 may report about beam 3 within the target cell 311 as a result of target beam measurements in response to the base station 323 of the source cell 313, also referred to as the source base station 323. Then source base station 323 may incorporate the beam information in BS-NCR and indicate the information to the base station 321 of the target cell 311, also referred to as the target base station 321. With the target beam information, a handover of wireless communication device 333 from the source cell 313 to the target cell 311 may proceed efficiently. In some embodiments, based on the beam information in BS-NCR as a precedence, and as long as a wireless communication device goes through a handover from the non-massive MIMO cell 313 to the massive MIMO cell 311, a default target beam may be beam 3.

As illustrated by FIG. 3, in some embodiments, a wireless communication device 332 goes through a handover from a massive MIMO cell 310 to a non-massive MIMO cell 312. The massive MIMO cell 310 may have a set of beams for dedicated beamforming, for example, beams {1, 2, 3, 4, 5, 6} whereas the non-massive MIMO cell 312 may not have. Since the non-massive MIMO cell 312, also referred to as the target cell 312, doesn't apply massive MIMO, there is no need for determining beam of the target cell 312. However, an enhanced handover procedure may be beneficial, for example, for determination of prioritized target cells for a handover. As shown in Table 2, when a wireless communication device, for example, wireless communication device 332, successfully performs a handover from a massive MIMO cell, for example, cell 310, to a non-massive MIMO cell, for example, cell 312, relevant beam information may be written into a BS-NCR by the source base station 320. With the beam information, a wireless communication device that uses beam 3 within the massive MIMO cell 310 may be mostly expected to be handed over to the non-massive MIMO cell 312. In some embodiments, when any wireless communication devices that use beam 3 come near to the edge of the massive MIMO cell 310, the base station 320 of the cell 310 may configure the wireless communication devices to prioritize measurements of the non-massive MIMO cell 312 and hand the wireless communication devices over to the non-massive MIMO cell 312 if a measurement report shows a result in line with expectation.

Furthermore, when a beam, for example, beam 3, from a massive MIMO cell, for example, cell 310, points to a certain area where a neighbor cell is unique according to a BS-NCR, wireless communication devices, for example, a wireless communication device 332 that uses beam 3 and comes near to the edge of the massive MIMO cell 310, may be directly handed over to the neighbor cell, for example, neighbor cell 312, also referred to as target cell 312, without target cell measurements.

Components of the wireless communication device, for example, transmitters, receivers, transceivers, memories, processors, antennas, RF chains, and baseband processors may for example be implemented by one or more circuitries.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
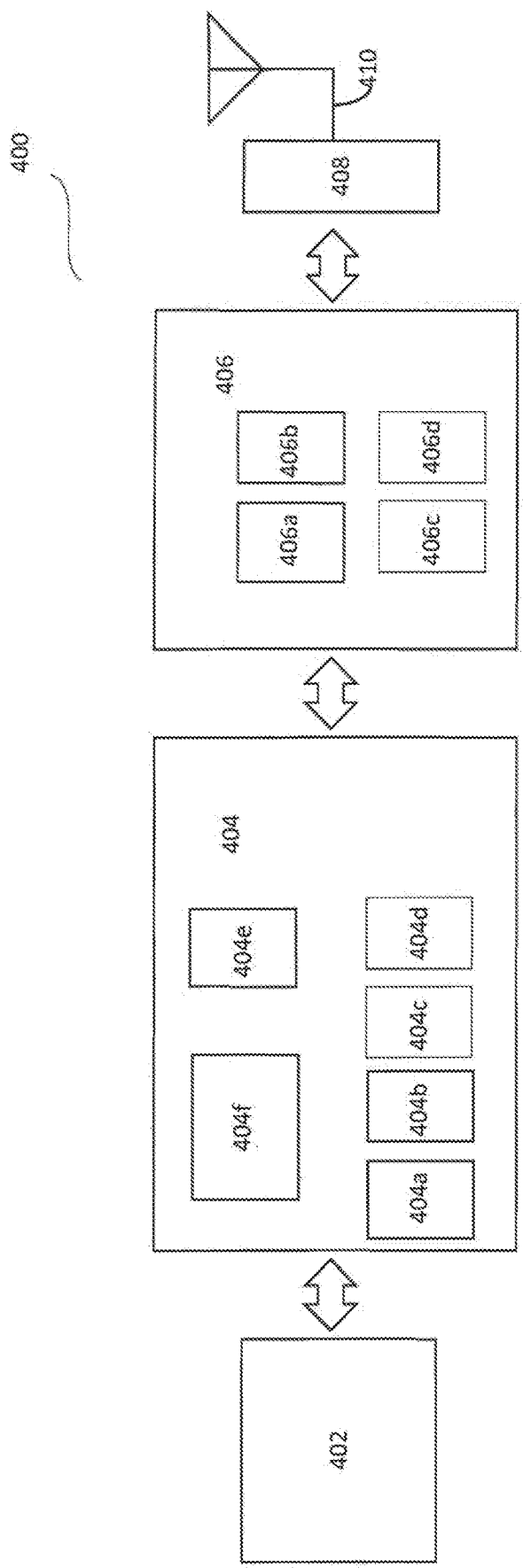
FIG. 4 shows an exemplary wireless communication device in accordance with some embodiments.

Embodiments described herein may be implemented into a system using any suitably configured hardware and/or software. FIG. 4 illustrates, for one embodiment, example components of a wireless communication device 400. In some embodiments, the wireless communication device 400 may include application circuitry 402, baseband circuitry 404, Radio Frequency (RF) circuitry 406, front-end module (FEM) circuitry 408 and one or more antennas 410, coupled together at least as shown.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer including a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410.

In some embodiments, the wireless communication device 400 may include additional elements such as, for example, memory/storage, display, camera, sensor, and/or input/output (I/O) interface.

A wireless communication device is located in an advanced wireless communication system such as a LTE or a 5G wireless communication system. The wireless communication device performs enhanced handover procedures within the wireless communication system. As described, the wireless communication device may be a UE, a mobile device, a receiver, a transmitter, a transceiver, or a MS. A plurality of cells of the wireless communication system may apply massive MIMO.

Figure 5:
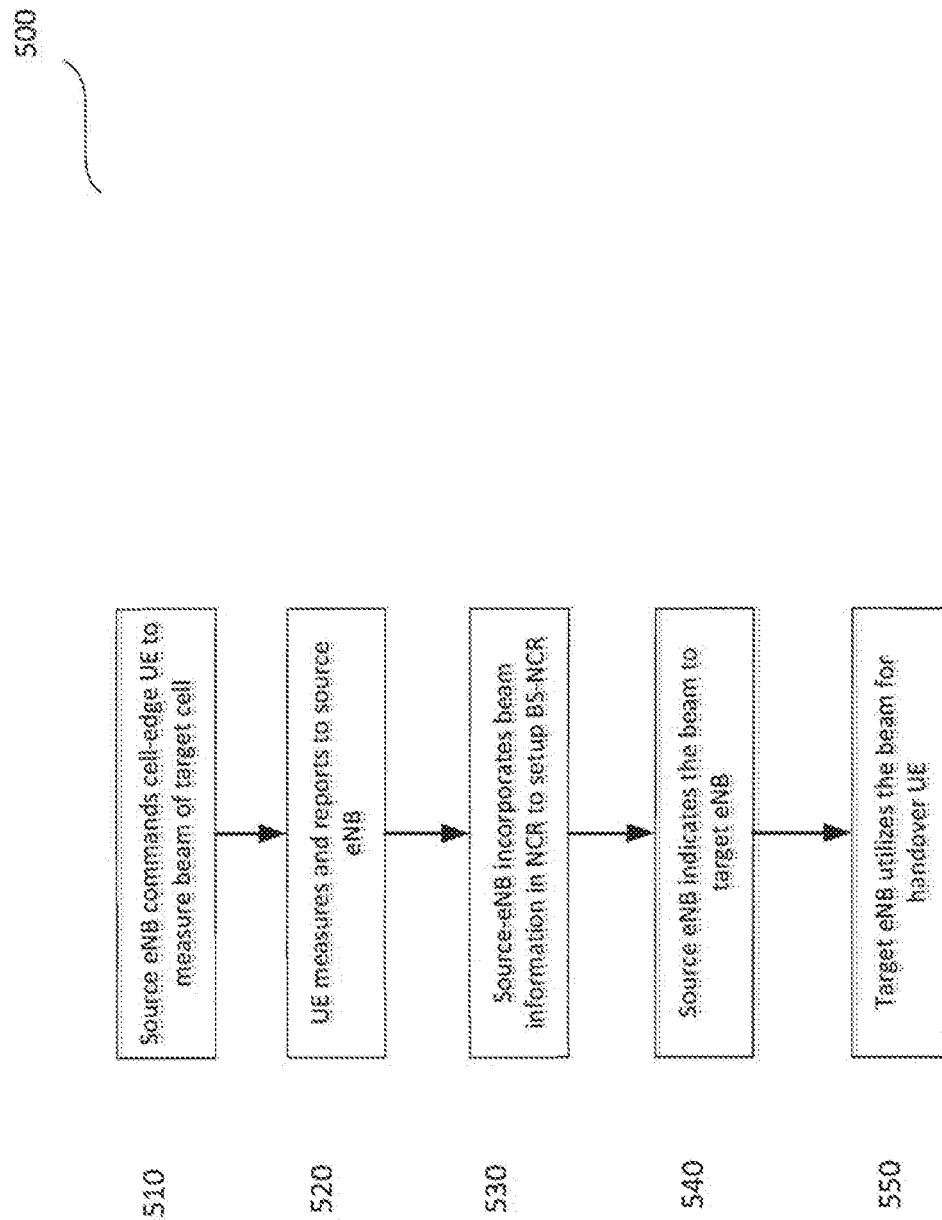
FIG. 5 shows a flow diagram illustrating an example method for setting up and utilizing Beam Specific-Neighbor Cell Relation (BS-NCR) in accordance with some embodiments.

FIG. 5 shows a flow diagram 500 that illustrates a flow diagram depicting an example method for setting up and utilizing Beam Specific-Neighbor Cell Relation (BS-NCR).

In 510, a source base station 320 of a source cell, for example, source cell 310 illustrated by FIG. 3, signals a wireless communication device at cell edge, for example, wireless communication device 330 illustrated by FIG. 3, to measure beamformed reference signals at a neighbor cell, for example, cell 311 illustrated by FIG. 3. The source base station 320 signals the wireless communication device 330 about spatial waveform formed by the beamformed reference signals of the neighbor cell 311 based on certain antenna weights experiencing radio propagation channels. The neighbor cell 311 is referred to as a target cell as well in a context of handover. The source base station 320 provides relevant locations and sequences of the beamformed reference signals to the wireless communication device 330 as well while signaling.

In 520, the wireless communication device 330 measures and reports results of the measurements in response to the source base station 320 of the source cell 310. Such measurements may be conducted at a time prior to or the same as when the wireless communication device 330 measures neighbor cell 311's RSRP or RSRQ for handover. Parameters such as RSRP and RSRQ, including absolute or relative signal strength of cell-specific reference signals in the neighbor cell 311, also referred to as the target cell 311, belong to the legacy handover procedure for LTE systems of 3GPP without considerations of dedicated beams for massive MIMO.

In 530, the base station 320 for the source cell 310 incorporates beam information in NCR to set up a BS-NCR, as shown in Table 2.

In 540, the base station 320 for the source cell 310 indicates the beam information to the base station 321 of the target cell 311 based on the beam information in the BS-NCR.

In 550, the base station 321 for the target cell 311 then utilizes the indicated information of neighbor beam(s), and performs data transfer for the wireless communication device 330 that undergoes a handover procedure.

As described, the base station 321 for the target cell 311 may obtain beamformed reference signals in advance for a handover of the wireless communication device 330. Handover latency may be decreased and handover failure ratio may be reduced.

Figure 6:
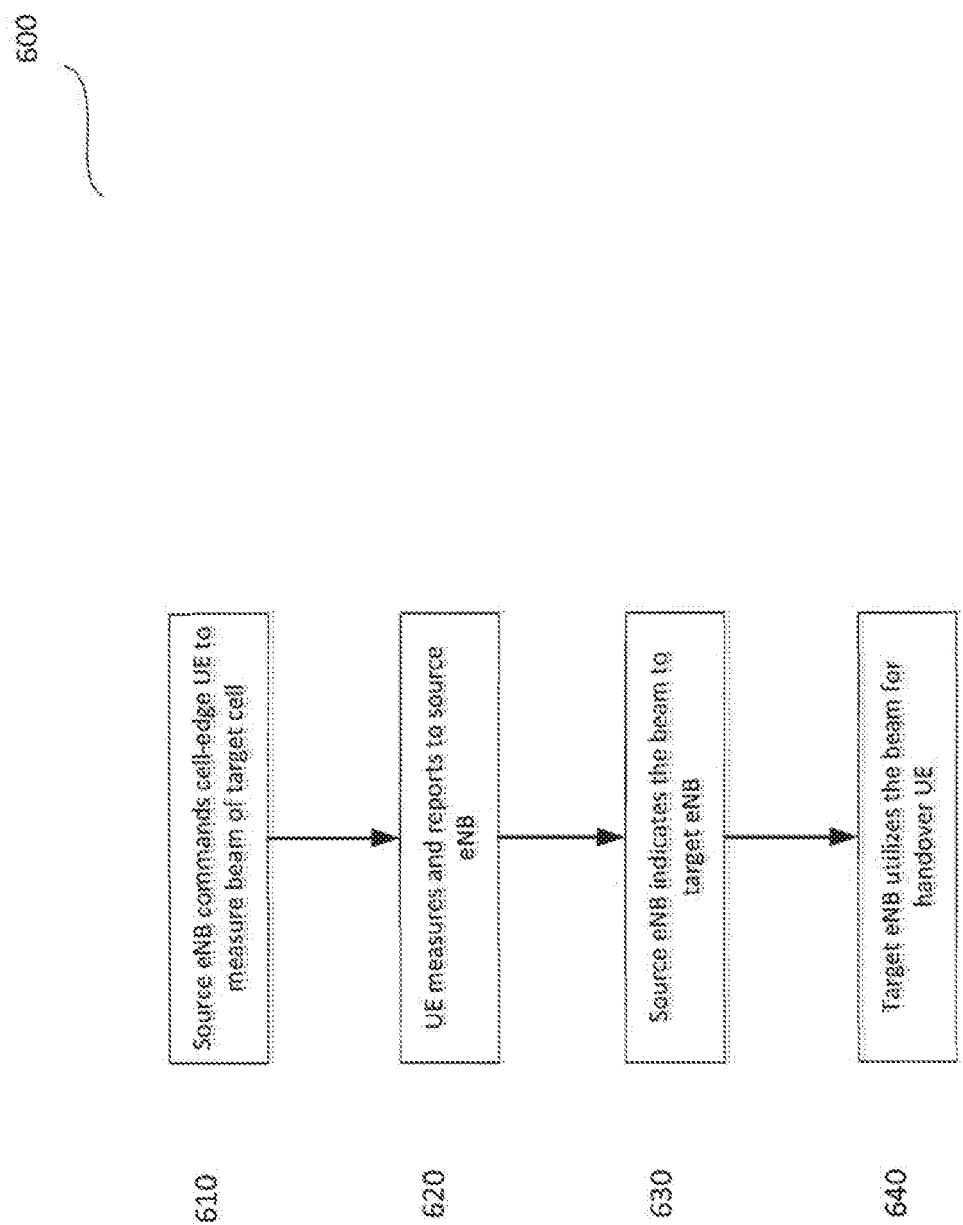
FIG. 6 shows a flow diagram illustrating a second example method for setting up and utilizing BS-NCR in accordance with some embodiments.

FIG. 6 shows a flow diagram 600 that illustrates a flow diagram depicting a second example method for setting up and utilizing Beam Specific-Neighbor Cell Relation (BS-NCR).

In 610, a source base station 320 for a source cell, for example, source cell 310 illustrated by FIG. 3, signals a wireless communication device at cell edge, for example, wireless communication device 330 illustrated by FIG. 3, to measure beamformed reference signals at a neighbor cell, for example, cell 311 illustrated by FIG. 3. The source base station 320 signals the wireless communication device 330 about spatial waveform formed by the beamformed reference signals of the neighbor cell 311 based on certain antenna weights experiencing radio propagation channels. The neighbor cell 311 is referred to as a target cell as well in a context of handover. The source base station 320 provides relevant locations and sequences of the beamformed reference signals to the wireless communication device 330 as well while signaling.

In 620, the wireless communication device 330 measures and reports results of the measurements in response to the source base station 320. Such measurements may be conducted at a time prior to or the same as when the wireless communication device 330 measures neighbor cell 311's RSRP or RSRQ for handover. Parameters such as RSRP and RSRQ, including absolute or relative signal strength of cell-specific reference signals in the neighbor cell 311, also referred to as the target cell 311, belong to the legacy handover procedure for LTE systems without considerations of dedicated beams for massive MIMO.

In 630, the base station 320 for the source cell 310 indicates the beam information derived from the wireless communication device 330's measurement report to the base station 321 of the target cell 311.

In 640, the base station 321 for the target cell 311 then utilizes the indicated information of neighbor beam(s), and performs data transfer for the wireless communication device 330 that undergoes a handover procedure.

Figure 7:
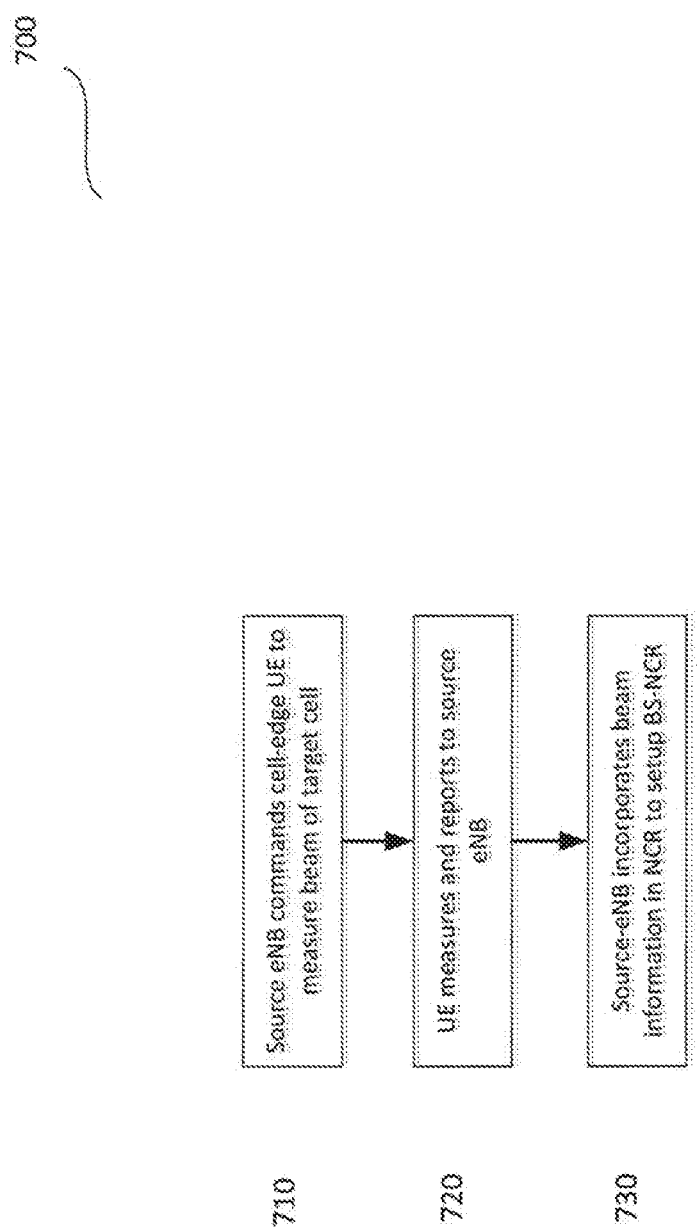
FIG. 7 shows a flow diagram illustrating a third example method for setting up and utilizing BS-NCR in accordance with some embodiments.

FIG. 7 shows a flow diagram 700 that illustrates a flow diagram depicting a third example method for setting up and utilizing Beam Specific-Neighbor Cell Relation (BS-NCR).

In 710, a source base station 320 for a source cell, for example, source cell 310 illustrated by FIG. 3, signals a wireless communication device at cell edge, for example, wireless communication device 330 illustrated by FIG. 3, to measure beamformed reference signals at a neighbor cell, for example, cell 311 illustrated by FIG. 3. The source base station 320 signals the wireless communication device 330 about spatial waveform formed by the beamformed reference signals of the neighbor cell 311 based on certain antenna weights experiencing radio propagation channels. The neighbor cell 311 is referred to as a target cell as well in a context of handover. The source base station 320 provides relevant locations and sequences of the beamformed reference signals to the wireless communication device 330 as well while signaling.

In 720, the wireless communication device 330 measures and reports results of the measurements in response to the source base station 320. Such measurements may be conducted at a time prior to or the same as when the wireless communication device 330 measures neighbor cell 311's RSRP or RSRQ for handover. Parameters such as RSRP and RSRQ, including absolute or relative signal strength of cell-specific reference signal in the neighbor cell 311, also referred to as the target cell 311, belong to the legacy handover procedure for LTE systems without considerations of dedicated beams for massive MIMO.

In 730, the base station 320 for the source cell 310 incorporates beam information in NCR to set up a BS-NCR, as shown in Table 2.

Figure 8:
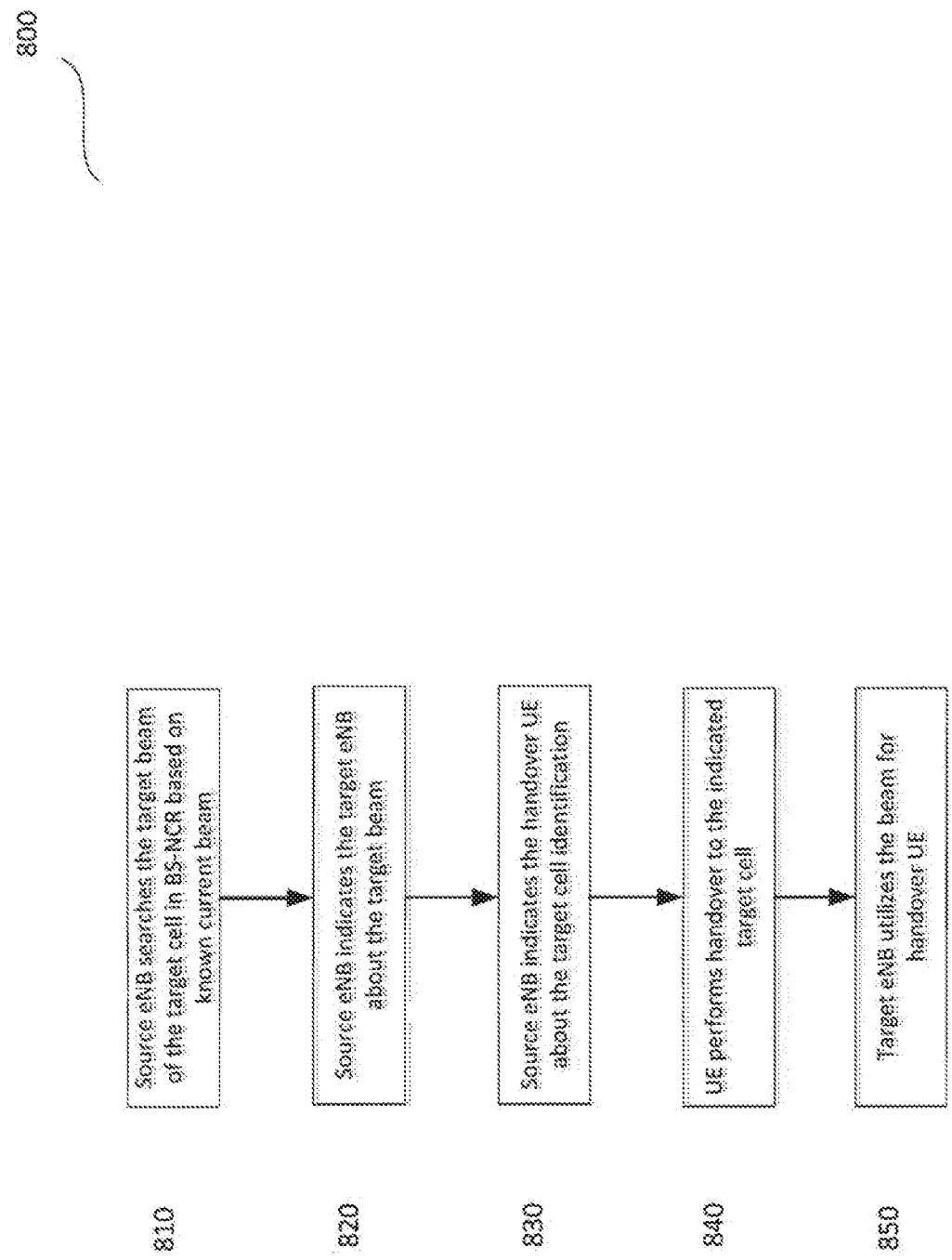
FIG. 8 shows a flow diagram illustrating a fourth example method for setting up and utilizing BS-NCR in accordance with some embodiments.

FIG. 8 shows a flow diagram 800 that illustrates a flow diagram depicting a fourth example method for setting up and utilizing Beam Specific-Neighbor Cell Relation (BS-NCR).

In 810, a base station, for example, the source base station 320 for a source cell, for example, the cell 310 illustrated by FIG. 3, searches existing BS-NCRs to find out a target cell, for example, cell 311, and a suitable beam as a target beam within the target cell 311. This is to address a target beam which is to be used in the target cell 311. The way of searching is to find out a target cell, including a target beam of the target cell corresponding to a current beam used in the source cell 310 for a handover of a wireless communication device, for example, wireless communication device 330 as illustrated by FIG. 3. The existing BS-NCRs, which may be established upon wireless communication devices entering into the wireless communication system with massive MIMO cells or established upon wireless communication devices' successful handovers as precedence, contain information of used beams.

In 820, the source base station 320 for the source cell 310 indicates the suitable beam to the target base station 321 of the target cell 311 based on the beam information in the BS-NCR. A suitable beam may, for example, fit for downlink channels, or be applied for uplink channels if there is a channel reciprocity that is greater than, for example, a pre-determined threshold. It may result in better performance for downlink or uplink data signals transferred for a wireless communication device that is to perform a handover. The better performances may include, for example, larger Signal-to-Interference-plus-Noise Ratio (SINR). The better performances may include also other improved metrics. It may also reduce interferences to other concurrent signals.

In 830, the source base station 320 indicates a wireless communication device at cell edge, for example, wireless communication device 330, about identifications of the target cell 311, so the wireless communication device 330 proceeds with handover to the target cell 311.

In 840, the wireless communication device 330 performs the handover to the indicated the target cell 311.

In 850, the target base station 321 for the target cell 311 then utilizes the indicated information of neighbor beam(s), and performs data transfer for the wireless communication device 330 that undergoes a handover procedure.

Figure 9:
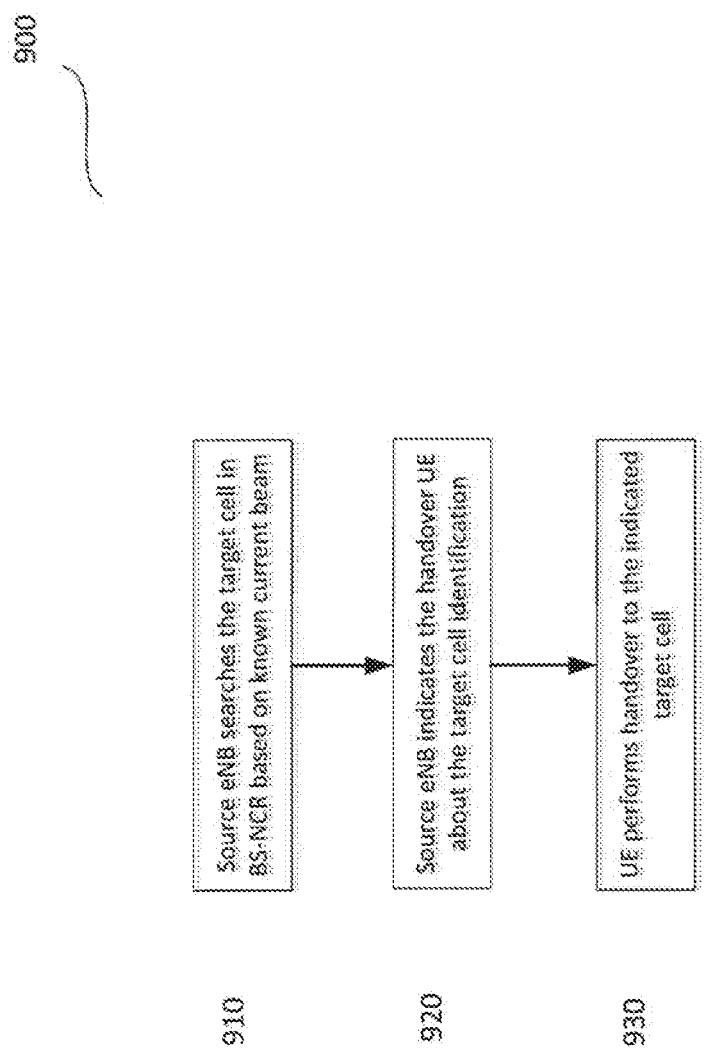
FIG. 9 shows a flow diagram illustrating a fifth example method for setting up and utilizing BS-NCR in accordance with some embodiments.

FIG. 9 shows a flow diagram 900 that illustrates a flow diagram depicting a fifth example method for setting up and utilizing Beam Specific-Neighbor Cell Relation (BS-NCR).

In 910, a base station, for example, the source base station 320 for a source cell, for example, the cell 310 illustrated by FIG. 3, searches existing BS-NCRs to find out a target cell, for example, cell 311, and a suitable beam as a target beam within the target cell 311. This is to address a target beam which is to be used in the target cell 311. The way of searching is to find out a target cell, including a target beam of the target cell corresponding to a current beam used in the source cell 310 for a handover of a wireless communication device, for example, wireless communication device 330 illustrated by FIG. 3. The existing BS-NCRs which may be established upon wireless communication devices entering into the wireless communication system with massive MIMO cells or established upon wireless communication devices' successful handovers as precedence contain information of used beams.

In 920, the source base station 320 indicates a wireless communication device at cell edge, for example, wireless communication device 330, about identifications of the target cell 311, so the wireless communication device 330 proceeds with handover to the target cell 311.

In 930, the wireless communication device 330 performs the handover to the indicated the target cell 311.

Figure 10:
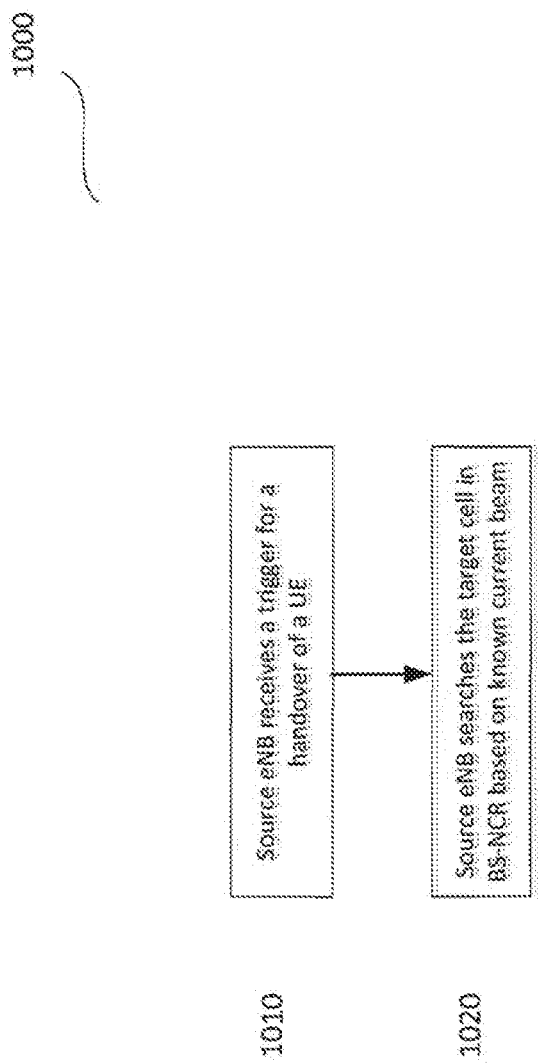
FIG. 10 shows a flow diagram illustrating a sixth example method for setting up and utilizing BS-NCR in accordance with some embodiments.

FIG. 10 shows a flow diagram 1000 that illustrates a flow diagram depicting a sixth example method for setting up and utilizing Beam Specific-Neighbor Cell Relation (BS-NCR).

In 1010, a base station, for example, the source base station 320 for a source cell, for example, the cell 310, receives a trigger for a handover of a wireless communication device 330 illustrated by FIG. 3. The trigger may include, for example, setting up and maintaining a table of Neighbor Cell Relation (NCR) when the wireless communication device 330 conducts the handover from the source cell 310 to another, or takes measurements for the handover. The trigger may also include, for example, searching existing BS-NCRs for the source 310 to find out a target cell, and a suitable beam within the target cell.

In 1020, a base station, for example, the source base station 320 for a source cell, for example, the cell 310 illustrated by FIG. 3, searches existing BS-NCRs to find out a target cell, for example, cell 311, and a suitable beam as a target beam within the target cell 311. This is to address a target beam which is to be used in the target cell 311. The way of searching is to find out a target cell, including a target beam of the target cell corresponding to a current beam used in the source cell 310 for a handover of a wireless communication device, for example, wireless communication device 330 illustrated by FIG. 3. The existing BS-NCRs which may be established upon wireless communication devices entering into the wireless communication system with massive MIMO cells or established upon wireless communication devices' successful handovers as precedence contain information of used beams.

In addition to the purposes of handover improvement for massive MIMO systems as above described, the proposed BS-NCR may be utilized for a variety of other purposes, such as interference coordination, load balance, or mobility optimization. In those applications, mutual influences between two cells may depend on pair of a current cell beam and a neighbor cell beam.

In some implementations, in a BS-NCR, one beam in a current cell may have relations with a set of beams in a neighbor cell. Possibilities of actual using each of set of beams may be obtained and maintained in a statistical way. Source base stations and target base stations need to select the most suitable beam amongst them for each time, and information of these possibilities may help accelerate process. For example, the source base stations may configure a wireless communication device to prioritize measurements of beams with high possibilities for use, or the target base stations may prioritize scanning of beams with high possibilities for use.

The following examples pertain to further embodiments.

Example 1 is a wireless communication device. The wireless communication device may optionally include one or more receivers configured to measure beams of a neighbor cell in response to a command of a massive Multiple-Input-Multiple-Output (MIMO) communication system, and may optionally include one or more transmitters configured to report information of the beams based on the measured beams to the massive MIMO communication system, and the information is incorporated in a Beam Specific-Neighbor Cell Relation (BS-NCR).

In Example 2, the subject matter of Example 1 may optionally include the receivers and transmitters being further configured to perform a handover in response to a base station of the neighbor cell of the massive MIMO communication system.

In Example 3, the subject matter of any of Examples 1-2 may optionally include the receivers and transmitters being further configured to perform a handover in response to a base station of a current cell of the massive MIMO communication system where the wireless communication device is located.

In Example 4, the subject matter of any one of Examples 1-3 may optionally include one or more memories configured to store the information of the beams of the neighbor cell.

In Example 5, the subject matter of Example 4 may optionally include the one or more memories being further configured to store identifications of the neighbor cell.

In Example 6, the subject matter of any one of Examples 1-5 may optionally include one or more processors configured to calculate the information of the beams of the neighbor cell.

In Example 7, the subject matter of Example 6 may optionally include the processors being further configured to determine whether and when to report the information of the beams to the massive MIMO communication system.

In Example 8, the subject matter of Example 7 may optionally include the determination being according to a trigger event including an A3-event defined by $3^{rd}$ Generation Partnership Project (3GPP).

In Example 9, the subject matter of Example 6 may optionally include the processors being further configured to determine which information of the beams of the neighbor cell to report about.

In Example 10, the subject matter of Example 6 may optionally include the processors being further configured to generate corresponding reporting messages.

In Example 11, the subject matter of any of Examples 1-10 may optionally include the BS-NCR being generated based on a Neighbor Cell Relation (NCR) that is defined by 3GPP with the information of the beams.

Example 12 is a method for performing handovers within a massive Multiple-Input-Multiple-Output (MIMO) communication system illustrated by FIG. 7.

In Example 13, the subject matter of Example 12 may optionally include further executing a handover from a source cell to a target cell of the massive MIMO communication system.

In Example 14, the subject matter of Example 13 may optionally include the execution of the handover being in response to a source base station for the source cell.

In Example 15, the subject matter of Example 13 may optionally include the execution of the handover being in response to a target base station for the target cell.

In Example 16, the subject matter of any one of Examples 12-15 may optionally include the command of the massive MIMO communication system includes relevant locations, and sequences of beamformed reference signals of the neighbor cell.

In Example 17, the subject matter of Example 16 may optionally include the beams of the neighbor cell including spatial waveform formed by the beamformed reference signals of the neighbor cell based on certain antenna weights experiencing radio propagation channels.

In Example 18, the subject matter of any one of Examples 12-17 may optionally include the measurement of the beams being triggered by an A3-event defined by $3^{rd}$ Generation Partnership Project (3GPP).

In Example 19, the subject matter of any one of Examples 12-18 may optionally include the measurement of the beams being conducted without a need to perform handovers.

In Example 20, the subject matter of any one of Examples 12-19 may optionally include the report of the information of the beams being conducted for statistical analyzing.

In Example 21, the subject matter of any one of Examples 12-20 may optionally include the BS-NCR being generated based on a Neighbor Cell Relation (NCR) that is defined by 3GPP with the information of the beams.

Example 22 is a computer readable medium having recorded instructions thereon which, when executed by a processor, make the processor perform a method for performing handovers within a massive MIMO communication system according to any one of Examples 12 to 21.

Example 23 is a method for a massive Multiple-Input-Multiple-Output (MIMO) communication system illustrated by FIG. 7.

In Example 24, the subject matter of Example 23 may optionally include further indicating the beam information of the BS-NCR to a neighbor base station of the neighbor cell to utilize the beam information for a handover of the wireless communication device.

In Example 25, the subject matter of Example 23 may optionally include indicating beam information of results of the measured beams to a neighbor base station of the neighbor cell in response to receiving the results of the measured beams, instead of incorporating the beam information of the results of the measured beams in a Neighbor Cell Relation (NCR), to utilize the beam information for a handover of the wireless communication device.

In Example 26, the subject matter of any one of Examples 23-25 may optionally include further utilizing the beam information for a handover of wireless communication devices coming from the neighbor cell of the massive MIMO communication system.

In Example 27, the subject matter of any one of Examples 24-26 may optionally include the beam information indicating a beam that fits for downlink channels or for uplink channels having a channel reciprocity that is greater than a pre-determined threshold.

In Example 28, the subject matter of any one of Examples 24-26 may optionally include the beam information indicating a beam with a larger Signal-to-Interference-plus-Noise Ratio (SINR).

In Example 29, the subject matter of any one of Examples 24-26 may optionally include the beam information indicating a beam that reduces interference to other concurrent signals.

In Example 30, the subject matter of any one of Examples 23-29 may optionally include the neighbor cell of the massive MIMO communication system is referred to as a target cell.

In Example 31, the subject matter of any one of Examples 23-30 may optionally include the NCR is defined by 3rd Generation Partnership Project (3GPP).

Example 32 is a method for utilizing a Beam Specific-Neighbor Cell Relation (BS-NCR) illustrated by FIG. 10.

In Example 33, the subject matter of Example 32 may optionally include indicating the beam information to a neighbor base station of the neighbor cell of the massive MIMO communication system utilize the beam information for the handover of the wireless communication device.

In Example 34, the subject matter of any one of Examples 32-33 may optionally include further indicating the neighbor cell of the massive MIMO communication system according to the beam information to the wireless communication device to perform the handover to the neighbor cell of the system.

In Example 35, the subject matter of any one of Examples 32-34 may optionally include further utilizing the beam information for a handover of wireless communication devices coming from the neighbor cell of the massive MIMO communication system.

In Example 36, the subject matter of any one of Examples 32-35 may optionally include further utilizing the beam information for interference coordination, load balance, or mobility optimization.

In Example 37, the subject matter of any one of Examples 32-36 may optionally include the massive MIMO communication system containing a number of cells employing massive MIMO.

It should be noted that one or more of the features of any of the examples above may be combined with any one of the other examples.

While specific aspects have been described, it should be understood by those skilled in the art that various changes in form and detail may be made therein without departing from the spirit and scope of the aspects of the present disclosure. All changes which come within the meaning and range of equivalency of the claims are therefore intended to be embraced.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

The invention claimed is:

1. A wireless communication device configured to access a radio communication network comprising a first network access node configured with a first radio communication technology and a second network access node configured with a second radio communication technology, the wireless communication device comprising:
   one or more processors configured to:
      conduct a first measurement of one or more beamformed reference signals of the second network access node in response to a command of the first network access node,
         wherein the command of the first network access node is triggered by an A3-event defined by 3$^{rd}$ Generation Partnership Project (3GPP), and the A3-event pertains to the wireless communication device;
      conduct a second measurement of one or more parameters of the second network access node,
         wherein a trigger to handover the wireless communication device from the first network access node to the second network access node is based on the second measurement; and
      generate, based on the first measurement, information about the beamformed reference signals of the second network access node for reporting to the radio communication network and incorporation in a Beam Specific-Neighbor Cell Relation (BS-NCR),
   wherein the second network access node is neighboring to the first network access node,
   wherein at least one of the first radio communication technology or the second radio communication technology is a massive Multiple-Input-Multiple-Output (MIMO) technology, and
   wherein the one or more processors are configured to conduct the first measurement prior to the second measurement.

2. The wireless communication device of claim 1,
   wherein the one or more processors are further configured to perform the handover of the wireless communication device from the first network access node to the second network access node, in response to signaling of the second network access node, and
   wherein the signaling of the second network access node corresponds to the trigger.

3. The wireless communication device of claim 1,
   wherein the one or more processors are further configured to perform the handover of the wireless communication device from the first network access node to the second network access node, in response to signaling of the first network access node, and
   wherein the signaling of the first network access node corresponds to the trigger.

4. The wireless communication device of claim 1, further comprising:
   one or more memories configured to store:
      the information about the one or more beamformed reference signals of the second network access node, and
      one or more identifications of the second network access node.

5. The wireless communication device of claim 1,
   wherein the one or more processors are configured to generate the information about the one or more beamformed reference signals of the second network access node by calculating the information about the one or more beamformed reference signals of the second network access node based on the first measurement.

6. The wireless communication device of claim 5,
   wherein the one or more processors are further configured to determine whether to report the information about the one or more beamformed reference signals to the radio communication network.

7. The wireless communication device of claim 5,
   wherein the one or more processors are configured to determine whether to report the information about the one or more beamformed reference signals to the radio communication network based on
   the A3-event.

8. The wireless communication device of claim 6,
   wherein the one or more processors are further configured to determine a subset of the information about the one or more beamformed reference signals of the second network access node to report.

9. The wireless communication devices of claim 1,
wherein the BS-NCR is generated based on a Neighbor Cell Relation (NCR) defined by 3GPP and based on the information about the one or more beamformed reference signals.

10. The wireless communication device of claim 1,
wherein the one or more processors are further configured to:
report the information about the one or more beamformed reference signals of the second network access node to the first network access node, and
perform the handover of the wireless communication device from the first network access node to the second network access node after the first network access node has indicated a subset of the information about the one or more beamformed reference signals of the second network access node to the second network access node.

11. A method for a wireless communication device configured to access a radio communication network comprising a first network access node configured with a first radio communication technology and a second network access node configured with a second radio communication technology, the method comprising:
conducting a first measurement of one or more beamformed reference signals of the second network access node in response to a command of the first network access node,
wherein the command of the first network access node is triggered by an A3-event defined by $3^{rd}$ Generation Partnership Project (3GPP), and the A3-event pertains to the wireless communication device;
conducting a second measurement of one or more parameters of the second network access node,
wherein a trigger to handover of the wireless communication device from the first network access node to the second network access node is based on the second measurement; and
generating, based on the first measurement, information about the one or more beamformed reference signals for reporting to the radio communication network and incorporation in a Beam Specific-Neighbor Cell Relation (BS-NCR),
wherein the second network access node is neighboring to the first network access node,
wherein at least one of the first radio communication technology or the second radio communication technology is a massive Multiple-Input-Multiple-Output (MIMO) technology, and
wherein conducting the first measurement is performed prior to conducting of the second measurement.

12. The method of claim 11, further comprising:
executing the handover of the wireless communication device from the first network access node to the second network access node.

13. The method of claim 12,
wherein executing the handover of the wireless communication device from the first network access node to the second network access node is in response to signaling of the first network access node, and
wherein the signaling of the first network access node corresponds to the trigger.

14. The method of claim 12,
wherein executing the handover of the wireless communication device from the first network access node to the second network access node is in response to signaling of the second network access node, and
wherein the signaling of the second network access node corresponds to the trigger.

15. The method of claim 11,
wherein the command of the first network access node indicates locations, and sequences of the one or more beamformed reference signals of the second network access node.

16. The method of claim 15,
wherein a spatial waveform formed by the one or more beamformed reference signals of the second network access node is based on antenna weights experiencing radio propagation channels.

17. A method for providing a wireless communication device with access to a radio communication network, the radio communication network comprising a first network access node configured with a first radio communication technology and a second network access node configured with a second radio communication technology, the method comprising:
commanding the wireless communication device to conduct a first measurement of one or more beamformed reference signals of the second network access node prior to the wireless communication device conducting a second measurement of one or more parameters of the second network access node,
wherein commanding the wireless communication device to conduct the first measurement of one or more beamformed reference signals of the second network access node is triggered by an A3-event defined by $3^{rd}$ Generation Partnership (3GPP), and the A3-event pertains to the wireless communication device,
wherein a trigger to handover the wireless communication device from the first network access node to the second network access node is based on the second measurement; and
storing, in response to receiving a result of the first measurement, information about the one or more beamformed reference signals of the second network access node for incorporation in a Neighbor Cell Relation (NCR) and generation of a Beam Specific-Neighbor Cell Relation (BS-NCR),
wherein the second network access node is neighboring to the first network access node,
wherein at least one of the first radio communication technology or the second radio communication technology is a massive Multiple-Input-Multiple-Output (MIMO) technology.

18. The method of claim 17, further comprising:
indicating, in response to receiving a result of the first measurement, the stored information about the one or more beamformed reference signals of the second network access node in the BS-NCR to the second network access node to utilize the information about the one or more beamformed reference signals of the second network access node for the handover of the wireless communication device.

19. The method of claim 17, comprising:
indicating, in response to receiving a result of the first measurement, the stored information about the one or more beamformed reference signals of the second network access node to the second network access node, without first incorporating the information about the one or more beamformed reference signals of the second network access node in the NCR, to utilize the information about the one or more beamformed reference signals of the second network access node for the handover of the wireless communication device.

20. The method of claim 17,
wherein the BS-NCR comprises a correlated set of data for handover analysis, indicating:
- a first cell identification (ID) of the first network access node,
- a first beam ID of the first network access node,
- a second cell ID of the second access node,
- a second beam ID of the second network access node, and
- one or more handover parameters for the handover of the wireless communication device.

\* \* \* \* \*